(No Model.)
W. A. LEECH & G. W. FOGLE.
NUT LOCK.
No. 380,123. Patented Mar. 27, 1888.
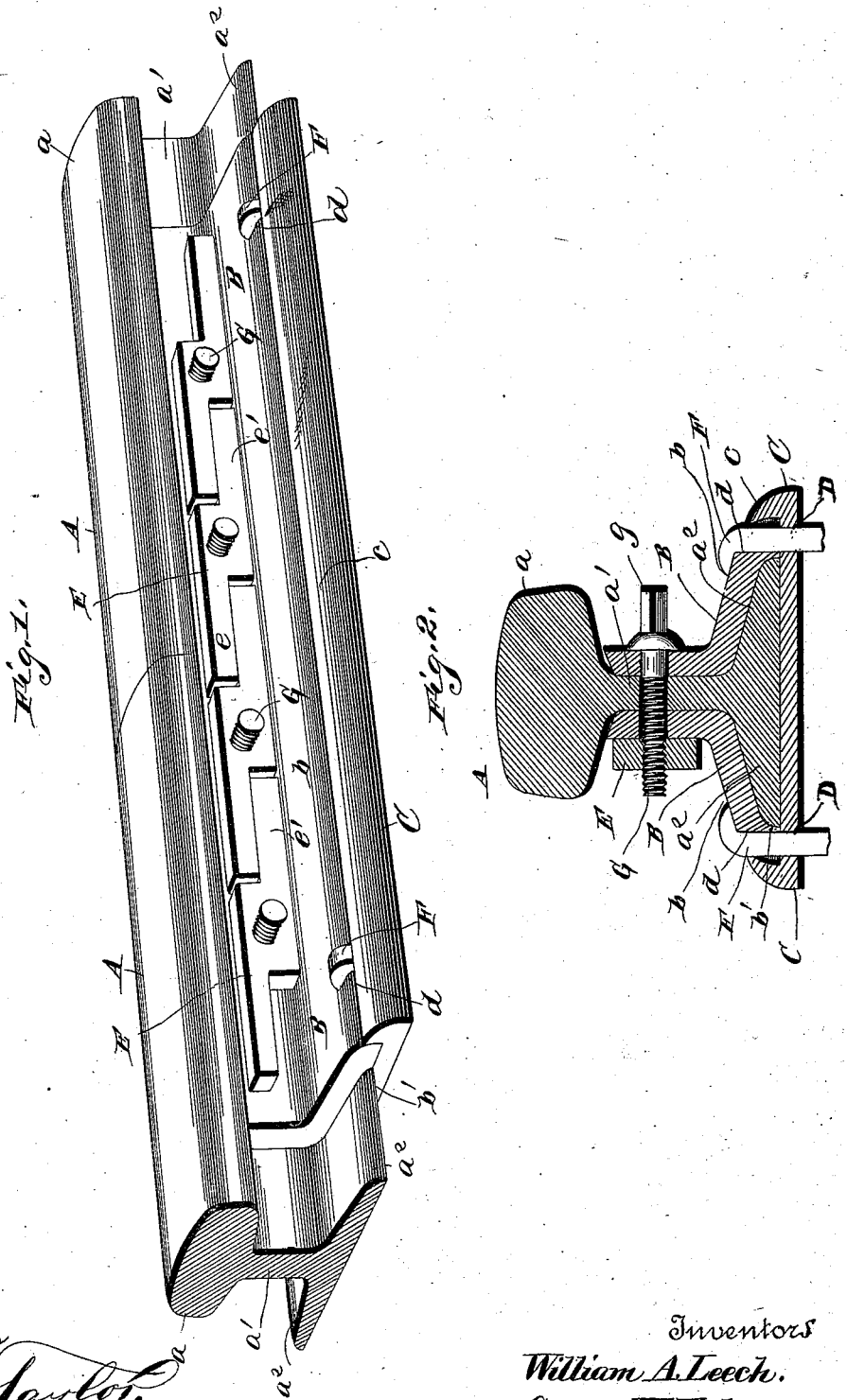
Witnesses
Inventors
William A. Leech.
George W. Fogle.

UNITED STATES PATENT OFFICE.

WILLIAM ANDREW LEECH AND GEORGE WASHINGTON FOGLE, OF NEW COMERSTOWN, OHIO.

NUT-LOCK.

SPECIFICATION forming part of Letters Patent No. 380,123, dated March 27, 1888.

Application filed December 21, 1887. Serial No. 258,617. (No model.)

*To all whom it may concern:*

Be it known that we, WILLIAM ANDREW LEECH and GEORGE WASHINGTON FOGLE, citizens of the United States, residing at New Comerstown, in the county of Tuscarawas and State of Ohio, have invented a new and useful Improvement in Rail-Joints, of which the following is a specification.

The invention relates to improvements in nut-locks; and it consists in the construction and novel combination of parts hereinafter described, and pointed out in the appended claims.

In the drawings, Figure 1 represents a perspective view of a nut-lock embodying the invention. Fig. 2 is a transverse section through the nut-lock at one of the bolts.

Referring to the drawings by letter, A A designate the meeting ends of two adjoining rails having the heads $a$, the webs $a'$, and the flanges $a^2 a^2$.

B B are similar fish-plates fitting snugly between the heads and flanges on each side of the meeting ends, and provided with the outstanding flanges $b$, longitudinally notched at $b'$ to fit on the edges of the corresponding flanges of the rails, and having their lower surfaces flush with the lower surfaces of said flanges, so that both fish-plates and rails will rest squarely on the chair-plate C, with the edge flanges, $c\ c$, of said plate resting against the edges of the flanges $b$ of the fish-plates.

D D are spike-openings in the chair-plate that register when the parts are in position with the spike-notches $d\ d$ in the edges of the flanges $b$ of the fish-plates.

E E are rectangular nuts, each having a horizontal rectangular extension, $e$, of its upper part in one direction and a similar extension, $e'$, of its lower part in the opposite direction. The said extensions are each half as wide as the nuts, but not quite long enough to reach to adjacent nuts on each side, so that when the nuts are in position the upper and lower projections of adjacent nuts will rest against each other, but will not touch the adjacent nuts.

To put the parts together each nut is separately held in place over the corresponding bolt-hole in the fish-plate of that side, and to the bolts G screwed home. The spikes F are then driven through the notches $d$ and openings D to hold the rails and fish-plates to the chair-plates. The bolts G are made with a squared end, $g$, or a squared projection, on the outside of their heads, so that they can be turned with a common wrench. Spiking the joint to the chair-plate prevents it from creeping on grades, and the flanges of the chair-plate prevent the fish-plates from spreading. The joints being very solid and compact, and the nuts prevented from turning by the projections $e\ e'$, which mutually impinge against each other and against the heads of the rails and flanges of the fish-plates, the vibrations of the passing rails cannot jar the nuts off from the bolts. The extensions $e\ e'$ prevent the nuts from turning on the fish-plate, so that the nuts have to be put or held in place and the bolts screwed into them.

Having described our invention, we claim—

1. In a nut-lock, the combination, with the rails, fish-plates, and bolts, of the rectangular nuts on each side of the meeting ends of the rails and provided with the extensions $e\ e'$, respectively, at their upper and lower opposite corners, which extensions have half of the width of the nuts and are sufficiently long to prevent the nuts from turning out of line to any appreciable degree without impinging either on the rail-head or the flange of the fish-plate, substantially as specified.

2. In a nut-lock, the combination, with the rails and fish-plate, of the bolts having their untapped ends squared, and collars adjoining said ends to rest on the adjacent fish-plate, and the rectangular nuts E, having the rectangular extensions $e\ e'$, which prevent the nuts from turning out of line to any appreciable extent, substantially as specified.

In testimony that we claim the foregoing as our own we have hereto affixed our signatures in presence of two witnesses.

WILLIAM ANDREW LEECH.
    GEORGE WASHINGTON FOGLE.

Witnesses:
 W. H. GALIGHER,
 W. A. JOHNS.